UNITED STATES PATENT OFFICE.

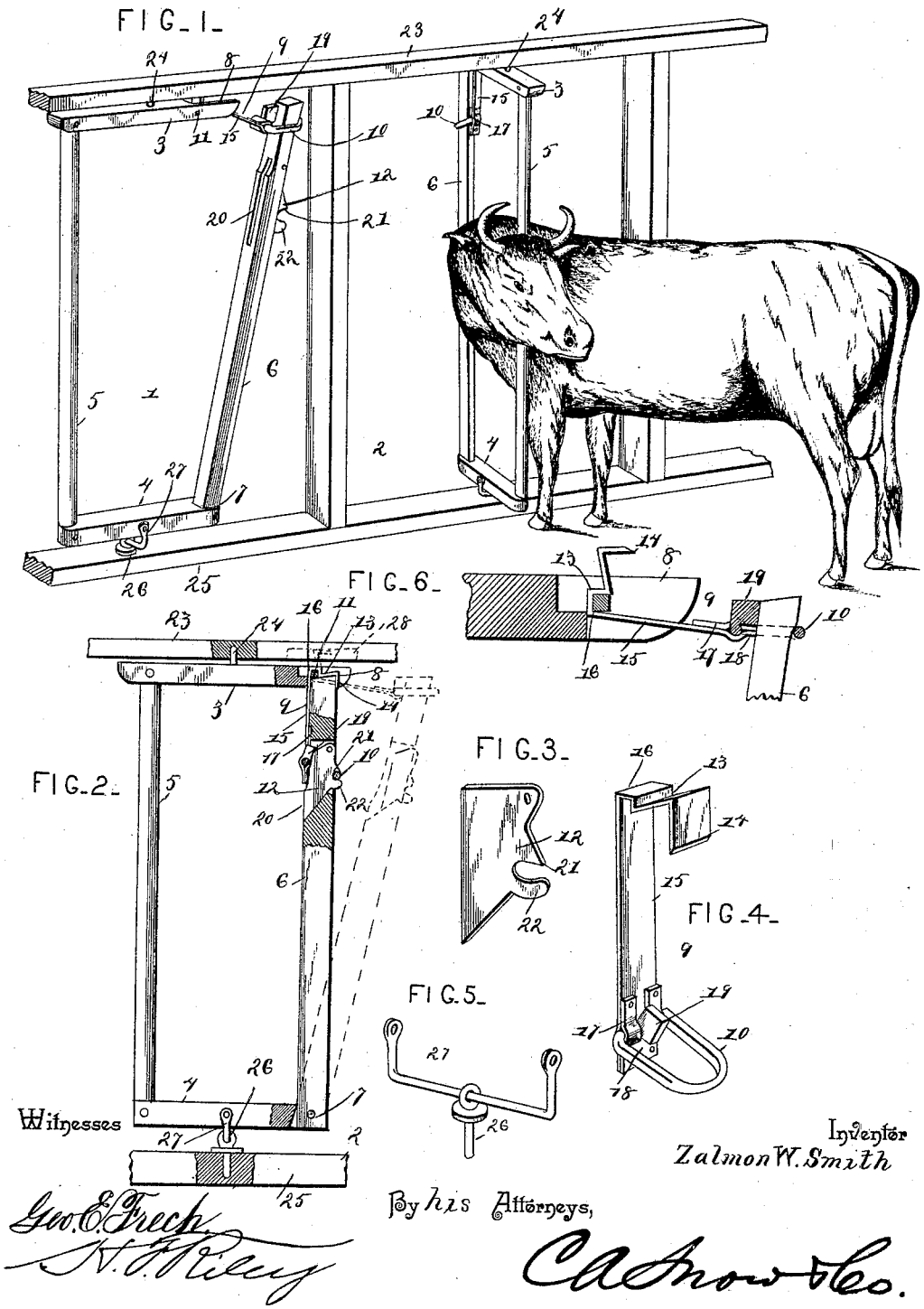

ZALMON W. SMITH, OF ADDISON, NEW YORK.

STANCHION.

SPECIFICATION forming part of Letters Patent No. 462,172, dated October 27, 1891.

Application filed February 24, 1891. Serial No. 382,585. (No model.)

*To all whom it may concern:*

Be it known that I, ZALMON W. SMITH, a citizen of the United States, residing at Addison, in the county of Steuben and State of New York, have invented a new and useful Stanchion, of which the following is a specification.

The invention relates to improvements in stanchions.

The object of the present invention is to provide a simple and inexpensive stanchion capable of allowing great freedom of movement to an animal and adapted to be readily opened and closed to release and secure an animal without liability of pinching the hand of the operator.

A further object of the invention is to prevent the upper end of the swinging side bar accidentally becoming separated from the fastening devices during the operation of opening and closing.

The invention consists of the construction and novel combination and arrangement of parts hereinafter fully described, illustrated in the accompanying drawings, and pointed out in the claims hereto appended.

In the drawings, Figure 1 is a perspective view showing stanchions constructed in accordance with this invention, one being closed and the other being open. Fig. 2 is a side elevation, partly in section. Figs. 3 and 4 are detail perspective views of the latch and the gravity-catch. Fig. 5 is a detail view of the lower pivot and the guide-bar. Fig. 6 is a detail sectional view.

Referring to the accompanying drawings, 1 designates a stanchion, which is pivotally mounted in a frame 2 and consists of top and bottom bars 3 and 4, a side bar 5, rigidly secured to the top and bottom bars, and a swinging side bar 6, having its lower end 7 hinged to the bottom bar 4 and its upper end when the stanchion is closed and in position for securing an animal arranged in a bifurcation 8 of the top bar 3. The upper end of the swinging side bar 6 of the stanchion is locked in the bifurcation 8 of the top bar by a latch 9 and is connected therewith by a link 10, which encircles the swinging side bar 6 and is adapted to be moved upward on the same to carry the latch out of engagement with the upper end of the swinging bar and also out of engagement with a transverse pin 11, and the link is held in a lowered position to maintain the latch in engagement with the upper end of the swinging side bar by a pivoted gravity-catch 12. The latch 9 is constructed preferably of sheet metal, and is approximately L-shaped, and is provided at the end of its short arm 13 with a flange 14, arranged parallel with the long arm 15 and forming a rectangular recess to receive the upper end of the swinging side bar 6, and the latch is adapted to be lifted to release the side bar 6. When the latch is in its locked position and the stanchion is closed, the latch engages the transverse pin 11, which is arranged in the bifurcation 8 of the top bar and is squared and fits snugly in a rectangular groove or bend 16 at the angle of the L-shaped latch, whereby any play of the side bar 6 is prevented, and when the stanchion is in its open position to receive an animal, as illustrated in dotted lines in Fig. 2 of the accompanying drawings, the transverse pin 11 engages the rectangular groove or bend 16 and holds the latch in its approximately horizontal position and prevents the link 10 slipping downward. By swinging the side bar 6 slightly inward the latch is disengaged from the squared pin 11 and the link is allowed to descend. The link 10 is provided with a straight end bar, which is journaled in bearings 17, arranged a short distance from the end 18 of the long arm 15 of the latch, and when the stanchion is open and in the position shown in dotted lines in Fig. 2 the end 18 engages the side bar 6 while the arm 15 is at a slight inclination, but approximately horizontal, and the link 10 is prevented being raised any farther and slipping off the side bar 6, which is an advantageous construction. The straight end of the link 10 is provided with a rectangular lug 19, which is arranged between the bearings 17, and presents a straight edge to the side bar 6 and holds the link at right angles to the bar 6 and prevents the link binding while being lifted, and the bar 6 is provided with a slot or opening 20, in which the gravity-catch 12 is pivoted, and which also receives the lug when the stanchion is closed to enable the link to swing downward and engage the catch. The catch is constructed of sheet metal or other suitable material, and is provided with a shoulder 21 to engage the link and prevent the latter being accidentally lifted to release the side bar 6, and it is provided below the shoulder with a projection 22 arranged below the link when the latter is locked, and the projection 22 by being arranged below the link is readily disengaged by the finger, and the hand is then in proper position for raising the link, and it is not necessary to first release the link and then place the hand under the same, as would be the case were the projection 22 not employed.

The frame 2 may be the top and bottom bars of a structure, or a special frame may be provided for the stanchion, and the top beam 23 is connected with the top bar 3 by a pivot 24, and the bottom beam 25 is provided with a swiveled eyebolt 26, which serves as a pivot for the lower end of the stanchion and which is engaged by a guide-bar 27, arranged below the bottom bar 4 and having its ends bent upward and bolted to the sides thereof. By this construction the bottom bar of the stanchion has a limited lateral swing and greater freedom of movement is permitted to an animal, especially when the latter is lying down.

From the foregoing description and the accompanying drawings, the construction, operation, and advantages of the invention will be readily understood, and it will be seen that the stanchion can be readily opened and closed without liability of pinching the fingers.

In order to prevent the stanchion turning on its pivots during the opening of it, the top beam 23 is provided with a recess 28, which receives the upper portion of the latch.

What I claim is—

1. The combination of the frame having its bottom beam provided with an eyebolt, and the stanchion having its upper end pivoted to the frame and its lower end provided with a guide-bar arranged in the eyebolt and having its ends bent upward and secured to the bottom bar, whereby the lower end of the stanchion is permitted a limited lateral movement, substantially as described.

2. The combination of the stanchion comprising the top bar provided with the bifurcation 8, the bottom bar, the side bar rigidly connecting the top and bottom bars, and the swinging side bar 6, having its lower end hinged to the bottom bar, the squared pin 11, arranged in said bifurcation, the approximately-L-shaped latch, having the depending flange 14, and provided at its angle with the rectangular groove or bend 16, adapted to engage the pin 11, and the link receiving the swinging side bar 6 and journaled on the latch, substantially as described.

3. In a stanchion, the combination of the top bar 3, provided with the bifurcation, the swinging side bar 6, the squared pin arranged in the bifurcation, the approximately-L-shaped latch having the rectangular groove or bend at its angle, and the link receiving the bar 6, and journaled on the latch a short distance from the end 18, whereby the latter is adapted to engage the side bar 6 and prevent the link slipping off the upper end thereof, substantially as described.

4. In a stanchion, the combination of the top bar 3, provided with the bifurcation, the swinging side bar 6, the transverse pin 11, the latch, and the link encircling the side bar 6 and journaled on the latch, and provided with the rectangular lug 19, engaging the side bar 6, substantially as described.

5. In a stanchion, the combination of the top bar 3, provided with the bifurcation, the transverse pin arranged in the bifurcation, the latch, the link encircling the side bar and journaled on the latch, and provided with a lug, and the catch pivoted in an opening of the side bar 6, and provided with a shoulder to engage the link, and having a projection arranged below the link when the stanchion is closed, substantially as described.

In testimony that I claim the foregoing as my own I have hereto affixed my signature in presence of two witnesses.

ZALMON W. SMITH.

Witnesses:
J. H. SIGGERS,
R. W. DAYTON.